(12) United States Patent
Mertins

(10) Patent No.: US 12,328,094 B2
(45) Date of Patent: Jun. 10, 2025

(54) UNIAXIAL-TRACKING SOLAR ELEMENT

(71) Applicant: Frenell IP GmbH, Karlsruhe (DE)

(72) Inventor: Max Mertins, Freiburg (DE)

(73) Assignee: FRENELL IP GmbH (DE)

( * ) Notice: Subject to any disclaimer, the term of this patent is extended or adjusted under 35 U.S.C. 154(b) by 0 days.

(21) Appl. No.: 18/028,943

(22) PCT Filed: Aug. 16, 2021

(86) PCT No.: PCT/DE2021/100697
§ 371 (c)(1),
(2) Date: Mar. 28, 2023

(87) PCT Pub. No.: WO2022/068988
PCT Pub. Date: Apr. 7, 2022

(65) Prior Publication Data
US 2023/0336112 A1   Oct. 19, 2023

(30) Foreign Application Priority Data
Sep. 30, 2020   (DE) ............... 10 2020 125 526.8

(51) Int. Cl.
*H02S 20/32* (2014.01)
*F24S 23/70* (2018.01)
*F24S 30/425* (2018.01)

(52) U.S. Cl.
CPC .............. *H02S 20/32* (2014.12); *F24S 23/70* (2018.05); *F24S 30/425* (2018.05)

(58) Field of Classification Search
CPC ........ H01L 31/00–078; H02S 20/00–32; H10F 10/00–19; H10F 19/00–908
(Continued)

(56) References Cited

U.S. PATENT DOCUMENTS 10,333,459 B2   6/2019   Oh et al.
2010/0208375 A1*  8/2010   Albisu Tristan ........ F24S 30/42
29/525.01
(Continued)

FOREIGN PATENT DOCUMENTS

DE     112013005890    6/2014
EP     2787303         10/2014
(Continued)

*Primary Examiner* — Bach T Dinh
(74) *Attorney, Agent, or Firm* — Pandiscio & Pandiscio

(57) ABSTRACT

Uniaxial-tracking photovoltaic systems achieve a higher output than fixed-position solar installations because the solar modules can follow the position of the sun throughout the day and the radiation can thus be used at the optimum angle. The inherent weight and the additional wind loads, however, mean that high forces prevail, and this results in requirements for a large cross section and, ultimately, in higher costs being incurred for these structures. In order to solve this problem, the present invention proposes producing an axis module (2) from a plurality of casing-portion profiles, which on the one hand allows for a very stable structure made of a comparatively small quantity of materials, but on the other hand makes it possible for crossmembers (11) for supporting the solar modules to be guided through the axis module (2), and therefore for the torsional forces to which the axis module (2) is subjected to be reduced.

10 Claims, 2 Drawing Sheets

(58) Field of Classification Search
USPC .................................... 136/243–265
See application file for complete search history.

(56) References Cited

U.S. PATENT DOCUMENTS

| | | |
|---|---|---|
| 2015/0200621 A1 | 7/2015 | Reed et al. |
| 2018/0062569 A1* | 3/2018 | Oh .................... H02S 30/10 |
| 2020/0153382 A1 | 5/2020 | Ballentine et al. |

FOREIGN PATENT DOCUMENTS

| | | | |
|---|---|---|---|
| IT | PD20090193 | 1/2011 | |
| WO | WO-2014161757 A1 * | 10/2014 | ................ F24J 2/14 |

* cited by examiner

UNIAXIAL-TRACKING SOLAR ELEMENT

REFERENCE TO PENDING PRIOR PATENT APPLICATIONS

This patent application is a 371 national stage entry of pending prior International (PCT) Patent Application No. PCT/DE2021/100697, filed 16 Aug. 2021 by FRENELL GmbH for UNIAXIAL-TRACKING SOLAR ELEMENT, which patent application, in turn, claims benefit of German Patent Application No. 10 2020 125 526.8, filed 30 Sep. 2020.

The two (2) above-identified patent applications are hereby incorporated by reference.

FIELD OF THE INVENTION

The present invention relates to a uniaxially tracking solar element comprising a carrier structure and an axis module rotatably supported thereon, and a plurality of crossmembers, connected to the axis module, for supporting at least one solar module, the axis module being rotatable about an axis of symmetry, and on its circumference being divided into a plurality of casing section profiles that adjoin one another along their longitudinal edges.

BACKGROUND OF THE INVENTION

This type of tracking solar element is previously known in the prior art from US 2015/0200621 A1. In the cited document, a solar element is guided on a polygonal axis, and is connected thereto via a likewise polygonal collar that lies close against the polygonal axis.

Further prior art is also previously known from DE 11 2013 005 890 T5. It is known from the cited document for elements to track the position of the sun in order to operate the individual solar modules, in particular photovoltaic modules, as efficiently as possible. These modules achieve the best yields for an orientation that is always as perpendicular as possible to the incident solar rays, so that rotation about a central support axis is beneficial for these modules.

For a rotational axis that is aligned north-south, the achievable power yield in the mornings and evenings is increased, while the horizontal position during the middle of the day somewhat diminishes the maximum power generation. A power generation profile that is evened out in this way is much more grid-compatible on the one hand, and on the other hand also results in much greater power generation over the entire year in comparison to fixed-position solar installations.

Since straight photovoltaic modules have their own frame, which is too weak to allow fastening along a connecting edge directly at the rotational axis, transversely situated crossmembers which allow fixing of the solar modules along their longitudinal edges must be mounted on the rotational axis. The transverse profiles themselves must have a sufficient height to allow absorption of the bending and torsional moments caused by the module weight and the wind loads.

With the additional height of the transverse profiles mounted on the rotational axis, the mounting plane of the solar modules moves away from the midpoint of the rotational axis, resulting in increased torsional forces on the rotational axis in inclined module positions. These higher forces result in requirements for a larger cross section of the axis, and correspondingly increase the cost. In addition, the eccentricity of the module plane generates a torque which correspondingly increases the strength requirements for the tracking behavior and its cost.

In DE 11 2013 005 890 T5 cited above, this problem is solved by positioning the longitudinally situated supporting axis beneath the midpoint of the bearing axis, so that the support axis describes an arc around the rotational axis during the tracking. However, this in turn requires a high proportion of costly special components.

SUMMARY OF THE INVENTION

Against this background, the object underlying the present invention is to provide a uniaxially tracking solar element which, due to the inclined position, avoids occurring torques to the greatest extent possible, shifts the center of gravity as close as possible to the module plane, and thus avoids costly special components and high material requirements.

This is achieved by a uniaxially tracking solar element according to the features of independent Claim 1. Further meaningful embodiments may be inferred from the subsequent dependent claims.

According to the invention, it is provided that a carrier structure has a rotatably supported axis module via which the axis module may track the position of the sun above the earth. Multiple crossmembers are situated at this axis module, and solar modules may in turn be mounted on these crossmembers. However, the axis module itself is not produced in one piece, but, rather, is formed from multiple casing section profiles. This allows through openings to be provided in the casing section profiles, and the through openings are placed in such a way that oppositely situated through openings of one or multiple casing section profiles complement one another, congruently with a receiving channel, for inserting one crossmember into each receiving channel. It is thus possible to lower the crossmembers into the plane of the rotational axis without the axis module having to deflect from the plane of the rotational axis. The displacement of the axis module out of the region of the rotational axis, which is necessary in the prior art, may thus be dispensed with.

Theoretically, an arrangement of the module plane in the axial center could also be made by providing monolithic axes, which are solid or tubular, with corresponding through openings. However, with the typical wall thicknesses of greater than 2 mm, this would have the disadvantage that the zinc layer used as corrosion protection would be permanently damaged, which does not conform to the clear technical standards for tracking solar installations. This would not be the case if a thinner material, which is possible here, were used.

Furthermore, a butt-joined arrangement of crossmembers on both sides of the axis module would be possible only with an additional outlay for fastening elements and associated effort.

The casing section profiles may advantageously have longitudinal connecting seams extending lengthwise on both sides. These may be produced by folding the material of the casing section profiles, and are used to connect neighboring casing section profiles to one another. The connection may preferably be established by screwing or riveting, although welding or soldering is possible. A flat contact of the individual casing section profiles may be achieved by the surfaces that are formed in this way, so that a secure connection may be established. In addition, the lateral folds ensure a high degree of rigidity with regard to bending and twisting, so that great rigidity may be achieved even with a comparatively thin material.

However, the casing section profiles may also have further folds between the longitudinal connecting seams. Lastly, the casing section profiles must result in an axis module; with regard to stability it is meaningful for the axis module to be self-contained. If the axis module is to be formed as a polygonal axis module, it will have multiple straight wall sections, in the simplest case each casing section profile having a wall section and preferably also neighboring longitudinal connecting seams. If multiple wall sections are implemented in a casing section profile, these are separated from one another by a fold. In the case of a hexagonal axis module, which is produced from two casing section profiles, a casing section profile would have two folds, and optionally two additional folds at the longitudinal connecting seams.

However, if a fold is not to be provided, it is meaningful for the casing section profiles between the longitudinal connecting seams to have a cylindrical casing-shaped design, i.e., to be rounded in one direction, resulting in a cylindrical casing section. In addition, a round shape contributes to the stability of the casing section profiles.

The through openings in the wall sections of the casing section profiles preferably directly adjoin the longitudinal connecting seams. This allows the longitudinal connecting seams to additionally connect with the crossmembers in order to add further stability to the structure.

In particular, the through openings reproduce the outer contour of the crossmembers, so that for a possible fastening of the crossmembers to the longitudinal connecting seams, a force-fit connection to the crossmembers may also be established by additional clamping elements or by welding.

The crossmembers may assume many suitable shapes, and may thus be designed in particular as polygonal profiles, U profiles, C profiles, T profiles, or cap profiles. Cap profiles are particularly preferred, since they are stable, and the free ends may be utilized for supporting and for connecting to the longitudinal connecting seams, and also for supporting and fixing the solar modules, which thus easily fit between the crossmembers, as the result of which the distance of the module plane above the rotational axis is as small as possible.

The through openings are particularly advantageously even arranged in such a way that the receiving channels, which are formed by through openings in congruent alignment, intersect with or are at least tangential to the rotational axis and preferably also the axis of symmetry of the axis module. An arrangement is considered to be tangential in particular when a distance of the crossmembers from the rotational axis is ensured by a thickness of the metal sheet of a longitudinal connecting seam.

Since the axis module is thus a hollow profile, it is meaningful to close it off at the end via end plates. This also provides an attachment point at which the axis module may be held by the carrier structure. For this purpose, the end plate may preferably grip the cross-sectional shape of the axis module, so that the end plate at the end position may be introduced into the axis module and fastened there. In addition, the end plate may advantageously have edge connecting seams at the edge which are produced by folding out from the plane of the end plate, and which allow a connection to the casing section profiles. It is likewise possible to provide the end plate to be slightly larger than the cross section of the axis module, and to pull it over the end of the axis module. In both cases, a connection to the axis module may take place by use of the edge connecting seams.

In particular, the invention is suited for an application with solar modules that are designed as photovoltaic modules, optionally also two-sided, so-called bifacial, photovoltaic modules. By use of the invention, these solar modules may easily track the position of the sun. However, an application is also possible with solar thermal power plants, in which mirrors are suspended on the support structure, and their orientation on an absorber pipe is thus corrected.

The above-described invention is explained in greater detail below with reference to one exemplary embodiment.

DETAILED DESCRIPTION OF THE PREFERRED EMBODIMENTS

Figure 1:
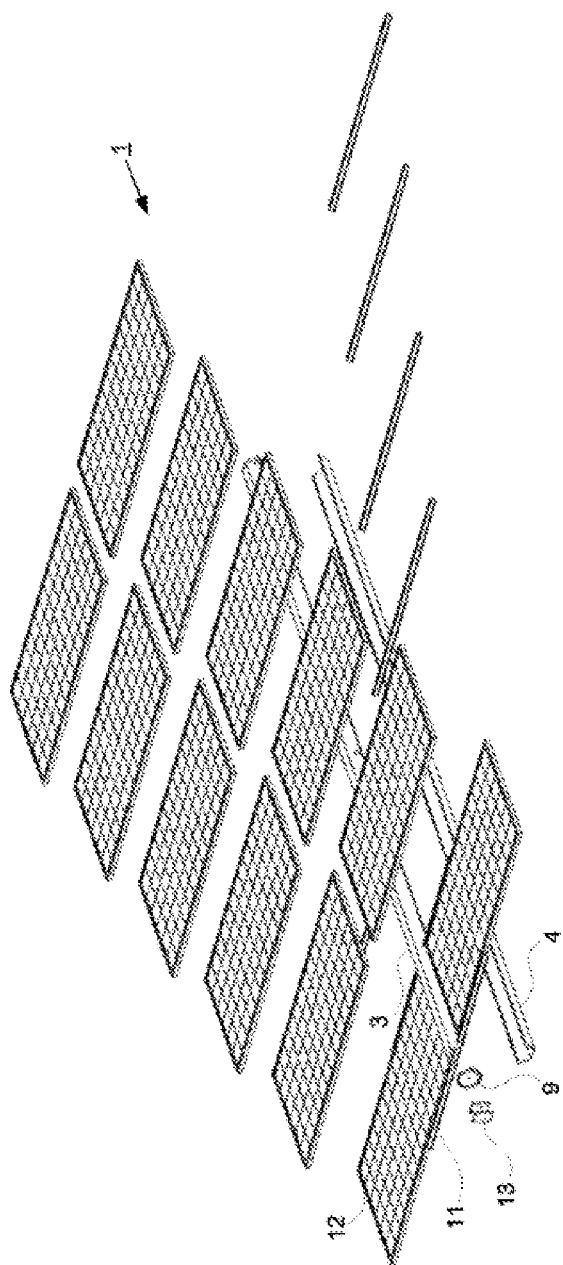
FIG. 1 shows a uniaxially tracking solar element in a perspective exploded illustration in an oblique top view.

FIG. 1 shows a solar element 1 that is made up of a plurality of photovoltaic modules 12. These photovoltaic modules are fastened to an axis module 2 by use of crossmembers 11, with the aid of which mounting on a support structure, not shown here, may take place, and via which the axis module 2 with the photovoltaic modules may track the position of the sun. The axis module 2 is produced from an upper first casing section profile 3 and a lower second casing section profile 4, which together form an axis body whose axis of symmetry at the same time also contains the rotational axis of the solar element 1. The crossmembers 11 are inserted into through openings 6 of the first casing section profile 3, so that the photovoltaic modules 12 simultaneously rest in the direct vicinity of the plane of the rotational axis. In this way, the bending and torsion moments due to the intrinsic weight and wind loads on the axis module 2 are reduced to the greatest extent possible.

The photovoltaic modules 12 have their own frame, so that it is sufficient for the individual modules to be merely partially gripped by the crossmembers 11, and in other respects they hang freely. The crossmembers 11 are designed with a cap profile, so that folds at the end on both sides form an L-shaped bearing surface for placing and contacting the frame of the photovoltaic modules 12.

Provided at the end on both sides is an end plate 9, which may be inserted into the axis module 2 and fastened, so that connecting means 13 may be connected to the carrier structure, not shown here.

Figure 2:
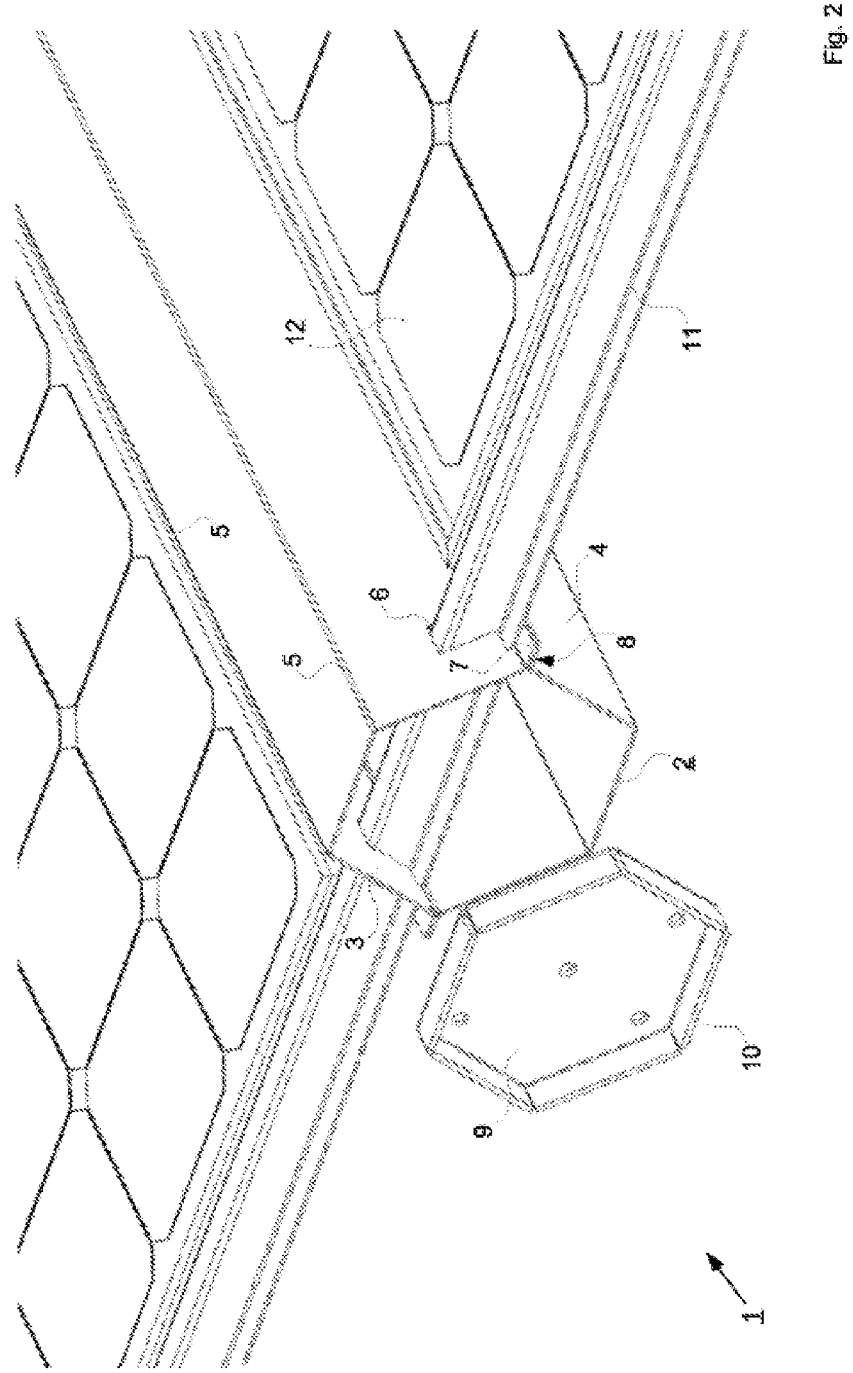
FIG. 2 shows the uniaxially tracking solar element according to FIG. 1 in a perspective illustration with the end plate lifted off, in an oblique top view.

FIG. 2 shows the assembled solar element 1 in detail, with the end plate 9 lifted off. The end plate 9 has circumferential edge connecting seams 10 in sections, which after the end plate 9 is introduced into the end of the cavity of the axis module 2 that is formed by the casing section profiles 3 and 4, may be connected to the casing section profiles 3 and 4.

Similarly, the first casing section profile 3 has a first longitudinal connecting seam 7, which is placed on a second longitudinal connecting seam 8 of the second casing section profile 4 and connected thereto. The two casing section profiles 3 and 4 thus form a three-dimensional body, which despite its small wall thickness is bend- and torsion-resistant due to multiple folds 5.

The crossmembers 11 to which the photovoltaic modules 12 are fastened have a cap profile, which is a U profile with outwardly facing folds of the side walls. This shape allows bearing of the photovoltaic modules 12, and at the same time allows bearing of the crossmembers 11 on the first longitudinal connecting seam 7.

The first casing section profile 3 has through openings 6 having a shape that corresponds to the cap shape of the crossmembers 11, so that the crossmembers 11 may be passed through two oppositely situated through openings 6 which, although they are inclined with respect to one another, are congruent. The crossmember 11 no longer has to be subsequently fastened with respect to the first casing section profile 3, and due to the connection to the photovoltaic modules 12 on both sides, it cannot fall out in either of the two directions. However, a connection is still recommended, and may be established, for example, by screwing to the longitudinal connecting seams 7 and 8.

As a result of the crossmembers 11 being guided through the interior of the axis module 2, the photovoltaic modules 12 are situated virtually in the plane of the rotational axis of the axis module 2, which in the present case simultaneously represents the axis of symmetry of the axis module 2. The bending and torsional moments at the axis module 2 due to the photovoltaic modules 12 are thus reduced to the greatest extent possible.

A uniaxially tracking solar element is thus described above which, due to the inclined position, avoids occurring torques to the greatest extent possible, shifts the center of gravity as close as possible to the module plane, and thus avoids costly special components and high material requirements.

LIST OF REFERENCE NUMERALS

1 solar element
2 axis module
3 first casing section profile
4 second casing section profile
5 fold
6 through opening
7 first longitudinal connecting seam
8 second longitudinal connecting seam
9 end plate
10 edge connecting seam
11 crossmember
12 photovoltaic module
13 connecting means

The invention claimed is:

1. A uniaxially tracking solar element (1) comprising a carrier structure and an axis module (2) rotatably supported thereon, and a plurality of crossmembers (11), connected to the axis module, for supporting at least one solar module, the axis module (2) being rotatable about an axis of symmetry, and on its circumference being divided into a plurality of casing section profiles (3, 4) that adjoin one another along their longitudinal edges, wherein the casing section profiles (3, 4) comprise a plurality of pairs of through openings (6), wherein each of the pairs of through openings (6) are disposed opposite one another such that they together define a receiving channel passing through the interior of the axis module (2) which is sized to receive a crossmember(11) such that the crossmember(11) passes through the receiving channel of the axis module (2), characterized in that the casing section profiles (3,4) have longitudinal connecting seams (7, 8) extending in parallel to their longitudinal edges on both sides, and neighboring casing section profiles (3,4) of the axis module (2) make contact at the surfaces of the longitudinal connecting seams (7,8), characterized in that the casing section profiles have a cylindrical casing-shaped curvature between the longitudinal connecting seams(7, 8).

2. The solar element according to claim 1, characterized in that the casing section profiles (3, 4) in each case have at least one fold (5), extending in parallel to their longitudinal edges, between the longitudinal connecting seams (7, 8).

3. The solar element according to claim 1, characterized in that the casing section profiles have a cylindrical casing-shaped curvature between the longitudinal connecting seams (7, 8).

4. The solar element according to claim 1, characterized in that the through openings (6) reproduce the outer contour of the crossmembers (11) in such a way that the crossmembers (11) are accommodated in the through openings (6) in a form-fit manner.

5. The solar element according to claim 4, characterized in that the crossmembers (11) are polygonal profiles, U profiles, C profiles, T profiles, or cap profiles.

6. The solar element according to claim 1, characterized in that the axis module (2) intersects with or is tangential to the axis of symmetry.

7. The solar element according to claim 1, characterized in that the axis module (2) in each case is closed off on both sides by an end plate (9), which is gripped in each case by the carrier structure via connecting means (13).

8. The solar element according to claim 7, characterized in that the end plate (9) has the cross-sectional shape of the axis module (2) and is insertable therein in a form-fit manner, and is connectable to the casing section profiles (3, 4) via edge connecting seams (10) that are situated around the outer contour of the end plate (9) and folded from the end plate (9).

9. The solar element according to claim 1, characterized in that the casing section profiles (3, 4) are designed as half-shells.

10. The solar element according to claim 1, characterized in that the solar modules are one-sided photovoltaic modules (12), two-sided photovoltaic modules, or mirror modules.

* * * * *